US009661951B2

(12) United States Patent
Bugnano et al.

(10) Patent No.: US 9,661,951 B2
(45) Date of Patent: May 30, 2017

(54) DELIVERY ASSEMBLY FOR MACHINES FOR PREPARING BEVERAGES VIA CAPSULES AND METHOD OF USING SAME

(71) Applicant: LUIGI LAVAZZA S.p.A., Turin (IT)

(72) Inventors: Luca Bugnano, Moncalieri (IT); Alberto Cabilli, Moncalieri (IT)

(73) Assignee: Luigi Lavazza S.p.A., Turin (IT)

( * ) Notice: Subject to any disclaimer, the term of this patent is extended or adjusted under 35 U.S.C. 154(b) by 315 days.

(21) Appl. No.: 14/406,097

(22) PCT Filed: May 8, 2013

(86) PCT No.: PCT/IB2013/053688
§ 371 (c)(1),
(2) Date: Dec. 5, 2014

(87) PCT Pub. No.: WO2013/182923
PCT Pub. Date: Dec. 12, 2013

(65) Prior Publication Data
US 2015/0150407 A1    Jun. 4, 2015

(30) Foreign Application Priority Data
Jun. 8, 2012 (IT) .............................. TO2012A0503

(51) Int. Cl.
*A47J 31/40* (2006.01)
*A47J 31/36* (2006.01)

(52) U.S. Cl.
CPC ......... *A47J 31/407* (2013.01); *A47J 31/3633* (2013.01); *A47J 31/3638* (2013.01)

(58) Field of Classification Search
CPC ... A47J 31/407; A47J 31/3633; A47J 31/3638
See application file for complete search history.

(56) References Cited

U.S. PATENT DOCUMENTS

| | | | |
|---|---|---|---|
| 2002/0148356 A1* | 10/2002 | Lazaris | A47J 31/0668 99/295 |
| 2011/0000377 A1* | 1/2011 | Favre | A47J 31/3628 99/289 R |
| 2012/0207894 A1* | 8/2012 | Webster | A47J 31/3638 426/433 |

FOREIGN PATENT DOCUMENTS

| | | |
|---|---|---|
| EP | 1 854 384 | 11/2007 |
| EP | 1 859 713 | 11/2007 |

(Continued)

OTHER PUBLICATIONS

International Search Report for PCT/IB2013/053688, mailed Jul. 12, 2013.

(Continued)

*Primary Examiner* — Anthony Weier
(74) *Attorney, Agent, or Firm* — Nixon & Vanderhye P.C.

(57) ABSTRACT

A delivery assembly for a machine for preparing beverages via capsules (10) includes:
a support structure (2) bearing an injector device (40) for introducing a fluid into a capsule (10);
a capsule-holder (50), mounted movable in the support structure (2);
guide elements (52-54, 32-34) designed to enable the capsule-holder (50) to displace between a position distanced from the injector device (40) and a position approached to the injector device (40);
an actuation kinematic arrangement (3-7), which can be operated for causing displacements of the capsule-holder (50) between the distanced position and the approached position; and
a longitudinally extended ejector member (70), mounted movable on the capsule-holder (50) and designed to eject the capsule (10) on the outside of the capsule- (Continued)

holder (50) during displacement of the capsule-holder (50) from the approached position to the distanced position.

The ejector member (70) includes a plurality of parts (74, 75) connected in an articulated way, amongst which at least one first part (74) and one second part (75) articulated in such a way that the second part (75) is able to assume a plurality of angular positions with respect to the first part (74) during displacement of the capsule-holder (50) between the distanced position and the approached position where it is close up.

17 Claims, 11 Drawing Sheets

(56) References Cited

FOREIGN PATENT DOCUMENTS

| WO | WO 2010/149468 | 12/2010 |
|----|----------------|---------|
| WO | WO 2011/015978 | 2/2011  |

OTHER PUBLICATIONS

Written Opinion of the International Searching Report for PCT/IB2013/053688, mailed Jul. 12, 2013.

\* cited by examiner

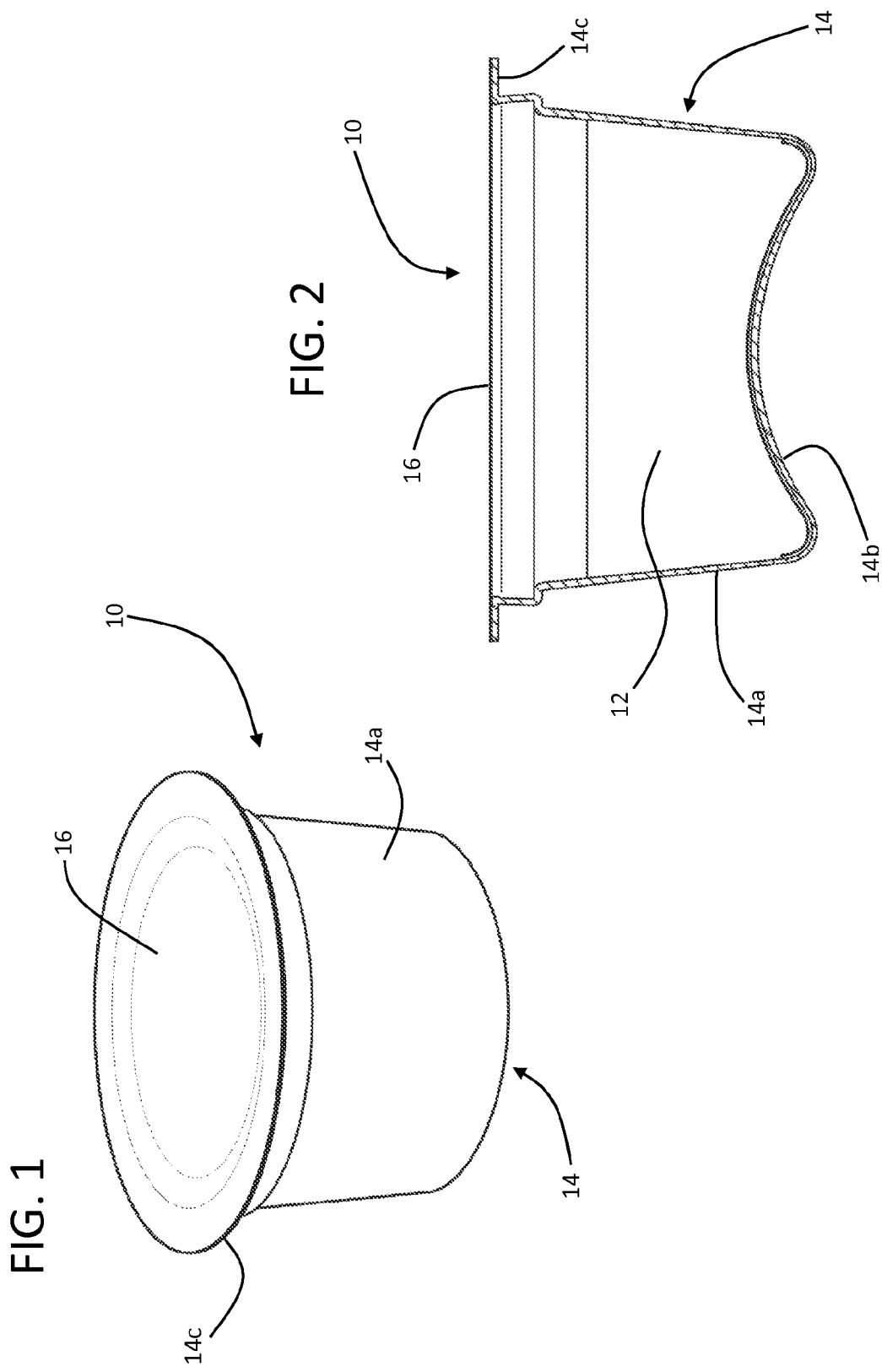

DELIVERY ASSEMBLY FOR MACHINES FOR PREPARING BEVERAGES VIA CAPSULES AND METHOD OF USING SAME

This application is the U.S. national phase of International Application No. PCT/IB2013/053688, filed 8 May 2013, which designated the U.S. and claims priority to IT Application No. TO2012A000503, filed 8 Jun. 2012; the entire contents of each of which are hereby incorporated by reference.

TECHNICAL FIELD

The present invention relates to machines, systems, and methods for preparing beverages and liquid products in general using capsules. The invention has been developed with particular reference to delivery assemblies for the machines of the type referred to above.

PRIOR ART

EP 1854384 A1 discloses a machine for preparing beverages using capsules having a delivery assembly that comprises a stationary injector device, a movable capsule-holder, and an actuation kinematic arrangement, which can be operated for causing displacements of the capsule-holder between a position distanced from the injector device and a position approached to the injector device, respectively for loading a capsule and for injecting water and/or steam under pressure therein.

Operatively associated to the capsule-holder is an ejection device, designed to eject automatically from the capsule-holder the exhausted capsule used for preparing the beverage. The above device comprises a longitudinally extended ejector member, axially movable with respect to the capsule-holder and designed to co-operate with an associated reaction member. The reaction member is constituted by a body that is mounted in the support structure of the assembly so as to be able to oscillate between a stable position and an unstable position. In its stable position, the reaction member is able to cause activation of the ejector member, while the capsule-holder passes from the injection position to the loading position. Instead, in its unstable position, the contrast member enables deactivation of the ejector member without the latter preventing insertion of a new capsule into the capsule-holder, at the end of passage from the injection position to the loading position. The reaction member is able to disengage from the ejector member and come back automatically into the stable position when the capsule-holder passes from its loading position to its injection position.

An ejection device technically similar to the one just been described is provided in the delivery assembly of the machine known from WO 2011015978 A1.

Use of an ejector member as envisaged in the cited prior documents guarantees ejection of a capsule even when, between the capsule itself and the capsule-holder, there occurs significant mechanical interference, for example due to a marked deformation of the body of the capsule that may come about following upon injection of hot water. However, the above known solution presents the drawback that the contrast member that is movably mounted occupies in itself a certain amount of space within the delivery assembly and around it there must be kept a free space, sufficiently wide to enable oscillation thereof. The overall dimensions of the delivery assembly are consequently increased.

AIM AND SUMMARY OF THE INVENTION

In view of what has been set forth above, the aim of the present invention is mainly to provide a delivery assembly having a compact structure, which is simple from the constructional standpoint, is convenient to use, and is distinguished by a high degree of reliability.

According to the invention, the aforesaid aims are achieved thanks to a delivery assembly for machines for preparing beverages and liquid products in general having the characteristics recalled in Claim 1. The invention likewise relates to a system and a method for preparing beverages that use the delivery assembly of Claim 1. Advantageous developments of the invention form the subject of the dependent claims. The claims form an integral part of the technical teaching provided herein in relation to the invention.

BRIEF DESCRIPTION OF THE DRAWINGS

The invention will now be described, purely by way of non-limiting example, with reference to annexed drawings, wherein:

FIGS. 1 and 2 are a perspective view and a cross-sectional view, respectively, of a generic sealed capsule that can be used in a machine for preparing liquid products according to the present invention;

DESCRIPTION OF PREFERRED EMBODIMENTS OF THE INVENTION

Figure 3:
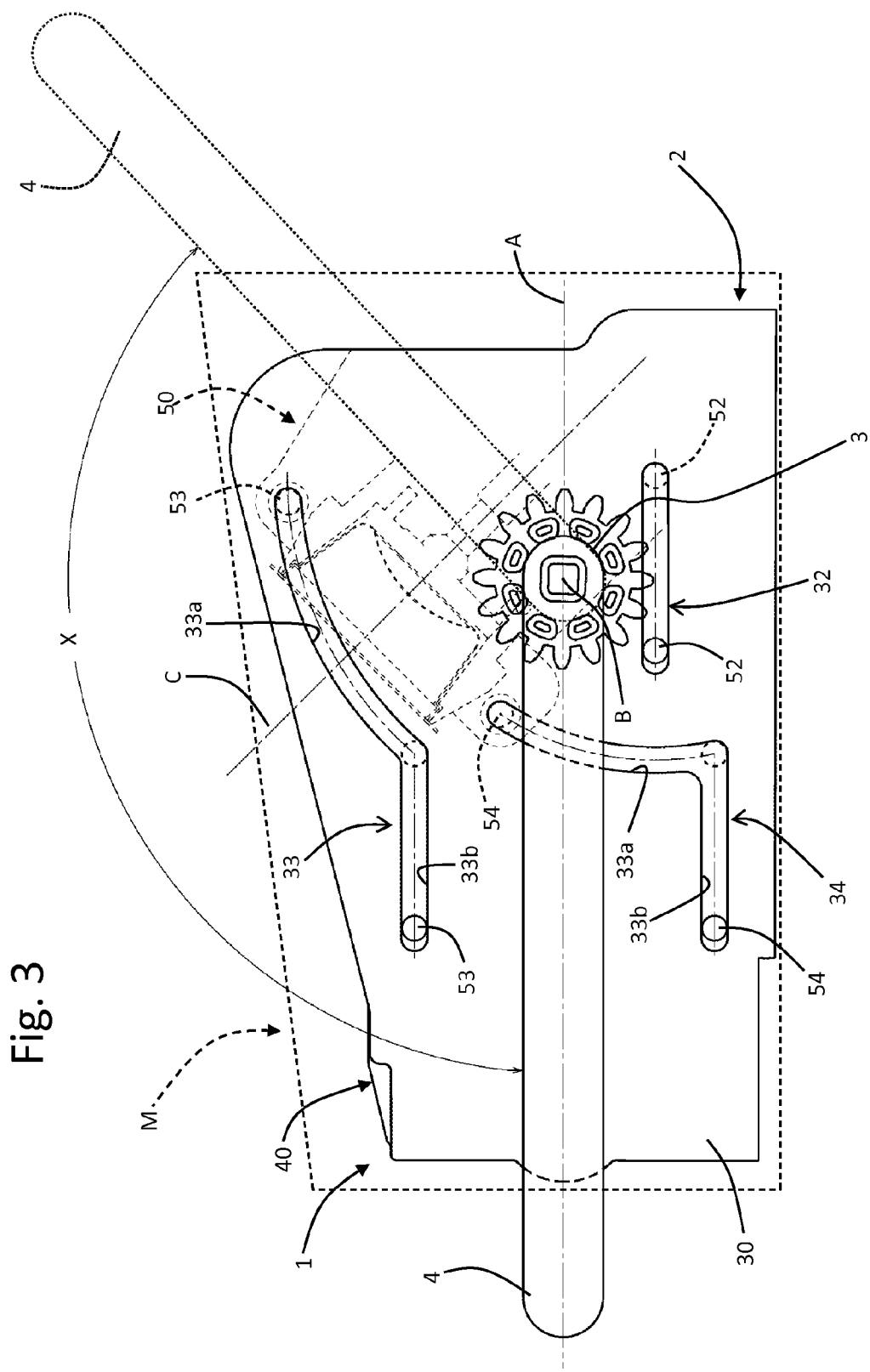
FIG. 3 is a schematic view in side elevation of a delivery assembly according to a possible embodiment of the invention.

Reference to "an embodiment" or "one embodiment" in the framework of this description is intended to indicate that a particular configuration, structure, or characteristic described in relation to the embodiment is comprised in at least one embodiment. Hence, phrases such as "in an embodiment" or "in one embodiment" and the like that may be present in various points of the present description do not necessarily refer to one and the same embodiment. Moreover, particular conformations, structures, or characteristics may be combined in any adequate way in one or more embodiments. The references used herein are provided merely for convenience and hence do not define the sphere of protection or the scope of the embodiments.

FIGS. 1 and 2 illustrate, merely by way of example, a capsule that can be used in a delivery assembly according to a preferred embodiment of the present invention. The capsule, designated by 10, contains a dose 12 of at least one substance that is able to form a liquid product using water and/or steam. The dose 12 may be constituted by ground coffee or some other precursor of a liquid product, such as for example tea, powdered or granular chocolate, products for preparing broths, soups, drinks, and infusions of various nature. In what follows, for simplicity, reference will be made to the preparation coffee, with the dose 12 that is hence understood as being constituted by ground coffee. In the structure of the capsule 10, as a whole substantially shaped like a tray or small cup, located within which is the dose 12, there may be distinguished:

a body 14, comprising a side or peripheral wall 14a and a bottom wall 14b that closes the body 14 at one end of the side wall 14a; and a closing wall 16, which closes the capsule 10 at the end opposite to the bottom wall 14b.

In the example illustrated, the capsule 10 is a hermetically closed capsule, with the wall 16 that is constituted by a sealing foil. The body of the capsule 10 is generally semi-rigid, preferably made of moulded plastic material, for example polypropylene-based plastic material, whereas the wall 16 is made of a flexible sheet material, for example an aluminium-based material. The invention may in any case also be used in combination with capsules made of other materials, for example capsules made of filter paper or the like, usually identified by the term "pod", and/or with capsules having the bottom wall and/or the closing wall provided with holes.

In the example, the wall or foil 16 is sealingly connected, for example by heat-sealing, to the side wall 14a of the body 14 of the capsule, in particular at an outer annular flange 14c thereof, which surrounds the mouth part of the body 14. The capsule 10 hence has a shape that is asymmetrical with respect to a plane passing through the flange 14c. In the case exemplified the body 14 is shaped like a cup or a tray that diverges starting from the bottom wall 14b to the end closed by the foil 16. Preferentially, said divergent shape is frustoconical. On the other hand, this shape is not imperative in so far as the capsule 10 may as a whole present different shapes; for example, it may be cylindrical, prismatic, frustopyramidal, etc. In the non-limiting example represented, the bottom wall 14b is shaped like a concave vault, with the concavity of said vault oriented towards the outside of the capsule 10. Also in this case, the choice of said shape is not imperative in so far as the capsule 10 could have, for example, a bottom wall 14b shaped like a vault with the concavity facing the inside of the capsule 10, or else a bottom wall 14b that is plane or substantially plane.

In FIG. 3 represented partially and schematically is a machine M for preparing beverages and liquid products in general using capsules, according to one embodiment of the invention. In FIG. 3, the machine M is represented limitedly to a delivery assembly thereof, designated as a whole by 1, which has a support structure or casing 2 that comprises two shaped side plates, one of which designated by 30, which extend facing and substantially parallel to one another.

In FIGS. 4 and 6-12, to enable the reader to view internal details of the assembly 1, the shaped plate 30 closest to the observer has been omitted. Once again for requirements of greater clarity, in FIG. 5, some components of the assembly 1—and specifically a capsule-holder, an ejector member and a contrast element—are represented isolated from other components, at a larger scale. It is moreover pointed out that the general structure of the delivery assembly 1 exemplified to a large extent corresponds to the assembly described in the document No. WO 2011015978 A1: consequently, in the sequel of the present description, only the elements useful for an understanding of the invention will be described.

Figure 4:
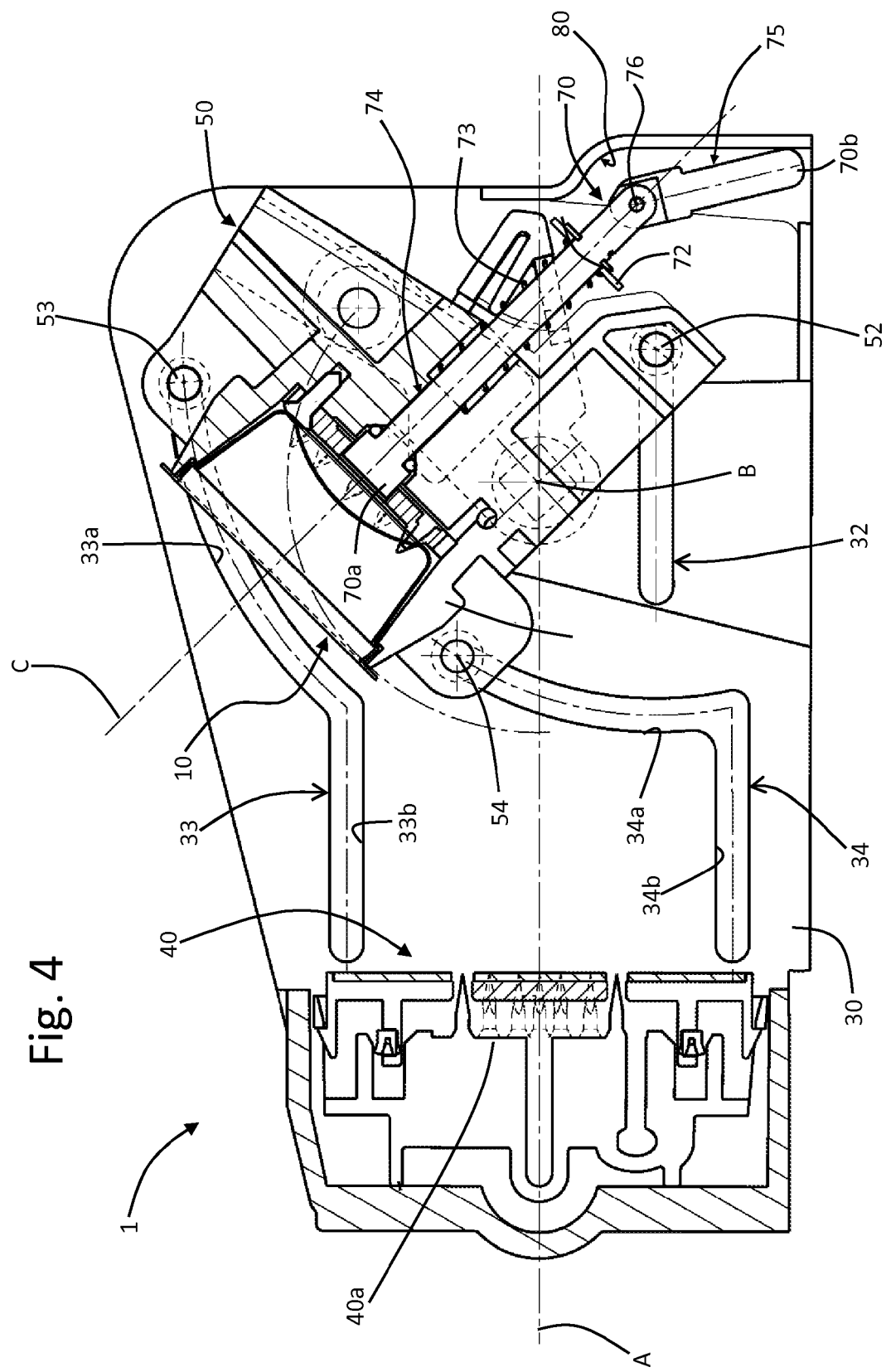
FIG. 4 is a partial schematic view in side elevation of the delivery assembly of FIG. 3, with some components removed, the assembly being in a first operating condition.

With particular reference to FIGS. 3 and 4, designated as a whole by 40 is an injector device, hereinafter defined for simplicity as "injector", for introduction of hot water and/or steam under pressure into a capsule. The injector 40 may be of any known type, and for this reason it will not be described in detail. In the example illustrated, the injector 40 has a main body mounted in a position stationary with respect to the structure 2, according to an operating axis A, and includes a corresponding perforating device, designated by 40a, which is also of any conception known in the field. As is customary, the injector 40 is connected to a heating device, not illustrated, such as a boiler, for heating water and/or generating steam.

The assembly 30 then comprises a capsule-holder 50, mounted movable in the support structure 2. In the embodiment illustrated, and as may be clearly seen in FIG. 5, the capsule-holder 50 has a body with a general cup-like formation, which defines a chamber or housing 51 for at least partially receiving a capsule 10.

The body of the capsule-holder 50, on its sides facing the plates 30, has two first appendages or pins 52 facing on opposite sides, said pins being aligned with one another horizontally. The pins 52 extend through respective guide slits 32, defined in the plates 30 and having a direction substantially parallel to the axis A, here generally horizontal. The body of the capsule-holder 50 is provided with two second appendages or pins 53, in a higher position than the pins 52, which also project transversely on opposite sides of the body of the capsule-holder. The pins 53, which are generally parallel to the pins 52, are designed to co-operate with two adjacent portions 33a and 33b of two guide slits 33, provided in facing positions in the plates 30. The portions 33a of the slits 33 extend as arcs of a circle and radius with the portions 33b, which are instead linear and basically parallel to the slits 32. Furthermore, in the preferred embodiment illustrated, the body of the capsule-holder 50 further comprises a third pair of projecting appendages or pins 54, like the pins 52 and 53, designed to co-operate with two adjacent portions 34a and 34b, of two further guide slits 34 provided in facing positions in the plates 30. Also the portions 34a of the slits 34 extend substantially as arcs of a circle and are radiused with the portions 34b, which are linear and substantially parallel to the slits 10 and to the linear stretches 33a of the slits 33.

In the example illustrated, and with particular reference to FIG. 3, the assembly 1 is manually operated and basically comprises a shaft 3 that extends between the plates 30 and is rotatable about an axis B, orthogonal to the plates themselves and generally horizontal. Laterally connected to at least one of the ends of the shaft 3 is a handle for actuation, designated by 4 only in FIG. 3. The handle 4 is represented in two respective end-of-travel positions, and in particular is represented with a dashed line in an inoperative position (which corresponds to a loading position of the capsule-holder 50), whereas it is represented with a solid line in an operative position (which corresponds to a working position or an injection position of the capsule-holder 50). The handle 4 is hence angularly movable about the axis B, as indicated by the arrow X in FIG. 3.

Further elements of the mechanism of actuation of the capsule-holder 50, namely the components designed to transmit the motion of the handle 4 to the capsule-holder 50, to displace it between a position distanced from the injector 40 (loading position) to a position approached to the injector 40 (working or injection position), are not illustrated in detail in the figures. As has been said, the assembly 1 may comprise components technically equivalent to the ones described in WO 2011015978 A1, and for this reason the reader is referred to the aforesaid document for a possible embodiment of the actuation mechanism. For such a case, transverse arms may anyway be fixed to the ends of the shaft 3, there being rotatably connected to the distal ends of the arms respective rollers (an arm and a corresponding roller are designated by 5 and 6, respectively, only in FIG. 8), where said rollers are able to extend within respective slide guides, for example in the form of grooves, defined in two opposite lateral surfaces of the body of the capsule-holder (such a guide is designated by 7 only in FIG. 8).

Figure 5:
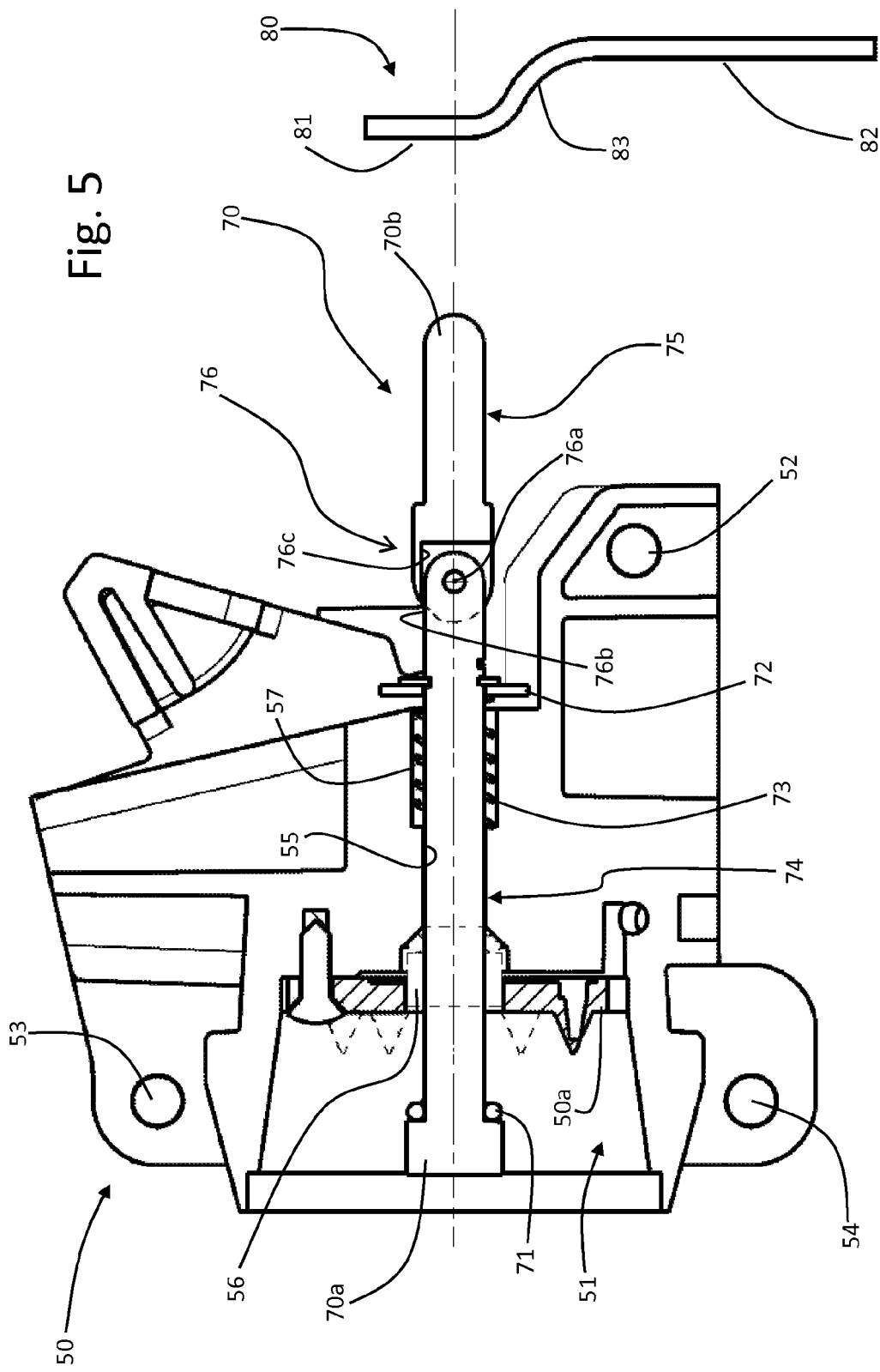
FIG. 5 is a schematic view in side elevation of some components of the assembly of FIG. 4.

With particular reference to FIG. 5, the body of the capsule-holder 50 has an axial passage 55, in which an ejector member (for simplicity referred to hereinafter as "ejector"), designated as a whole by 70, slides, said ejector having a longitudinally extended body. The ejector 70 has a head end 70a, which in the example represented includes a generally widened portion that may be received in a corresponding seat 56 on the bottom of the housing 51, said seat being defined by a front widened portion of the passage 55. Conveniently, operative between the head end 70a and a surface of the seat 56 is a sealing element 71, such as an annular gasket, designed to prevent any leakage of liquid from the housing 51 towards the inside of the passage 55 in which the ejector 70 slides.

In the example illustrated, the ejector 70 has an element 72 for preventing it from sliding out, set in an intermediate area thereof outside the passage 55, such as a pin, which functions also as arrest for the first end of an elastic element, in particular a spiral spring 73 mounted coaxially on the ejector 70, the opposite end of which bears upon the body of the capsule-holder 50. For this reason, in the example, the passage 55 has a further widened portion 57, opposite to the seat 56, that defines an arrest surface for the spring 73. The spring 73 operates to urge the ejector 70 towards a withdrawn position of the head 70a within the housing 51, where the head itself does not interfere with insertion of a capsule 10 into the housing 51.

On the side opposite to the head end 70a, the ejector 70 has a rear end 70b, which includes a portion designed to co-operate with a reaction element, designated as a whole by 80, for the purposes that will be clarified hereinafter. According to a preferential aspect of the invention, and unlike the prior art referred to previously, the reaction element 80 is an element that is stationary, in particular defined in, or associated in a fixed way to, the support structure 2 of the assembly 1. In one embodiment, the reaction element 80 has a body made of a synthetic material, for example nylon or teflon, to facilitate sliding of the rear end 70b of the ejector thereon.

According to the main characteristic of the invention, the ejector comprises a plurality of parts connected in an articulated way, amongst which at least one first part and one second part, where the first part preferentially includes the head end of the ejector and the second part preferentially includes the rear end of the ejector. The two aforesaid parts are articulated to one another, either directly or with interposition of a number of articulations, in such a way that the second part is able to assume a plurality of angular positions with respect to the first part and to the contrast element during displacement of the capsule-holder between the corresponding loading and working positions.

In the embodiment exemplified, the ejector 70 includes just two parts, designated by 74 and 75, which belong to the head end 70a and the rear end 70b, respectively. The two parts 74 and 75, here defined for simplicity as "front" and "rear", are connected to one another by means of a joint or articulation, designated as a whole by 76. The intermediate articulation 76 may be of any conception, in any case such that the rear part 75 of the ejector 70 is able to displace angularly with respect to the front part 74, and hence also with respect to the reaction element 80. In the example illustrated, for this purpose, the articulation 76 includes a pin designated by 76a in FIG. 5 for hinging the part 75 to the part 74, with the former that is thus able to assume a plurality of possible angular positions with respect to the latter, which is, instead, constrained to the linear movement in the passage 55 of the capsule-holder and that bears the spring 73 with the corresponding arrest 72. The pin 76a is preferably, but not necessarily, parallel to the pins 52-54 of the capsule-holder 50.

Preferentially, associated to the articulation 76 is an elastic element, not visible in the figures, such as for example a torsion spring, which forces the rear part 75 towards a predefined, or stable, angular position with respect to the front part 74. In the example, in the aforesaid predefined position, the two parts 74 and 75 are generally aligned in a longitudinal direction, i.e., forming between them an angle of 180° or close to 180°. On the other hand, the two parts 74 and 75 do not necessarily have to be coaxial, the respective axes possibly also being parallel to one another. Moreover, in the aforesaid predefined, or stable, position, the two parts 74 and 75 could even form between them an angle of other than 180°.

The predefined position can be determined with modalities in themselves known, for example by bestowing a suitable conformation of the end of the parts 74 and 75 in a position corresponding to the articulation 76, in particular defining there respective arrest surfaces, as exemplified in 76b and 76c in FIG. 5.

Figure 10:
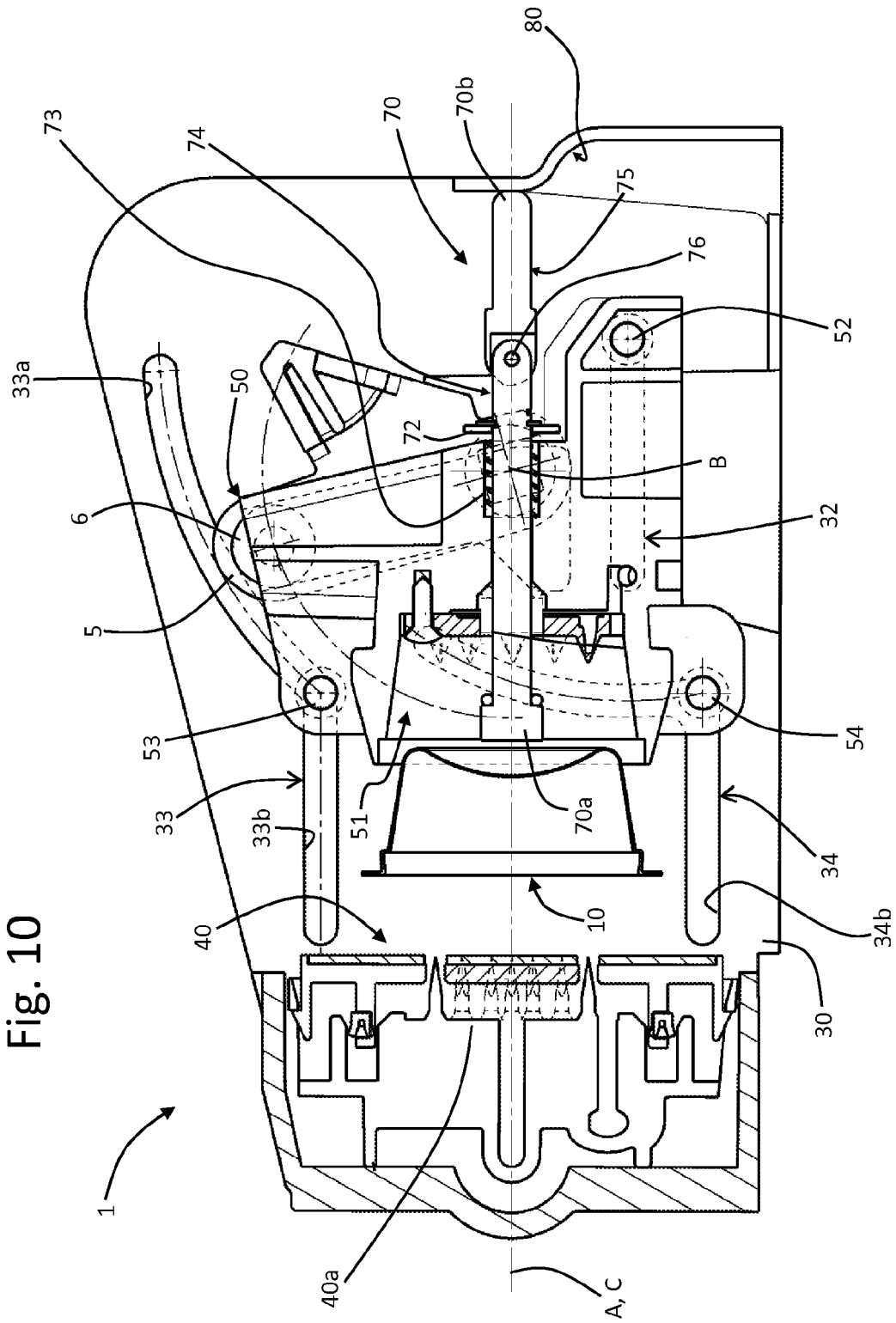

Once again with reference to the example illustrated, the reaction element 80 generally faces the ejector 70, in a position behind the capsule-holder 50, and defines a sliding surface for the corresponding rear end 70b, which preferentially has a partially rounded profile (it should be noted that, in FIG. 5, the reaction element 80 has been deliberately represented in a position at a distance from the end 70b, even though the ejector 70 is represented on the capsule-holder 50 in a position corresponding to that of FIG. 10).

In a preferred embodiment, such as the one illustrated, the surface defined by the reaction element 80 includes a first stretch 81 and a second stretch 82, at different heights, with which the rear end 70b of the ejector co-operates in different phases of passage of the capsule-holder 50 between the loading and working positions, as will emerge clearly hereinafter.

The stretches 81 and 82, the front surfaces of which are preferably but not necessarily parallel, extend at different distances from the injector 40, in particular with the upper stretch 81 that is closer to the injector 40 with respect to the lower stretch. Preferentially, but not necessarily, at least the upper stretch is substantially plane, and even more preferably both of the stretches are substantially plane, as in the example represented. Once again with reference to the example of embodiment illustrated, between the two stretches 81 and 82 there extends a transition or connecting stretch 83, which has a generally inclined or curved configuration. The configuration illustrated is advantageous for the purpose of facilitating movement of the part 75 of the ejector as described hereinafter, but is not mandatory in so far as different profiles and orientations for the sliding surface are possible, parameterized for obtaining the functions described hereinafter. For example, the sliding surface of the element 80 could include a single vertical or substantially vertical stretch, or else a single inclined or curved stretch, or again a plane upper stretch, like the stretch 81, and a single inclined or curved lower stretch, which replaces the stretches 82 and 83 represented here.

Operation of the assembly 1 will now be described with reference to FIGS. 4 and 6-10.

We shall assume that initially the assembly 1 is in the condition illustrated in FIG. 4. In this condition, the capsule-holder 50 is set in the respective loading position, identified by the axis C, where it is at a distance from the injector 40 and is designed to receive in its housing a capsule 10 (in FIG. 4 the capsule 10 is already inserted in the housing 51 of FIG. 5). In this condition, the pins 52 of the capsule-holder 50 are located substantially at the rear ends of the respective guide slits 32 (on the right, as viewed in the figure). The pins 53 are located substantially at the rear ends (on the right, as viewed in the figure) of the arched portions 33a of the slits 33; the same applies for the pins 34, which are located at the upper end (on the right, as viewed in the figure) of the respective arched portions 54a of the slits 54. In this condition, the ejector 70 as a whole is urged by the corresponding spring 73 into the respective withdrawn position, where its head end 70a does not interfere with introduction of the capsule 10 into the corresponding housing of the capsule-holder 50.

The rear part 75 of the ejector 70 is in a first angular position with respect to the front part 74, with the end 70b that rests on the lower stretch (82, FIG. 5) of the reaction element 80, urged therein by the elastic reaction of the spring associated to the articulation 76. The lower angle formed between the parts 74 and 75 is less than 180°.

Figure 6:
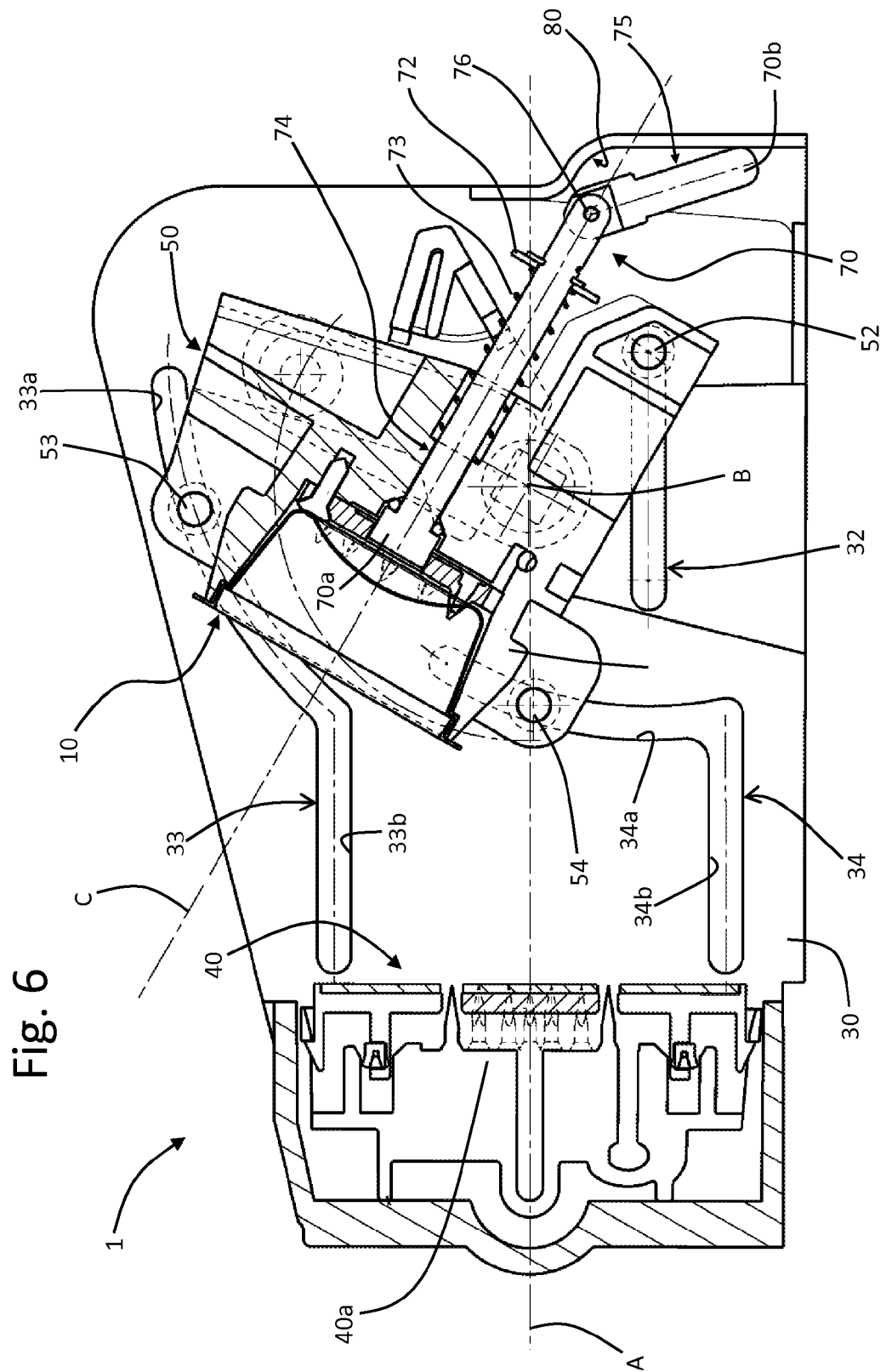
FIGS. 6, 7, 8, 9, and 10 are views similar to the view of FIG. 4, but with the assembly in as many different operating conditions.
Figure 7:
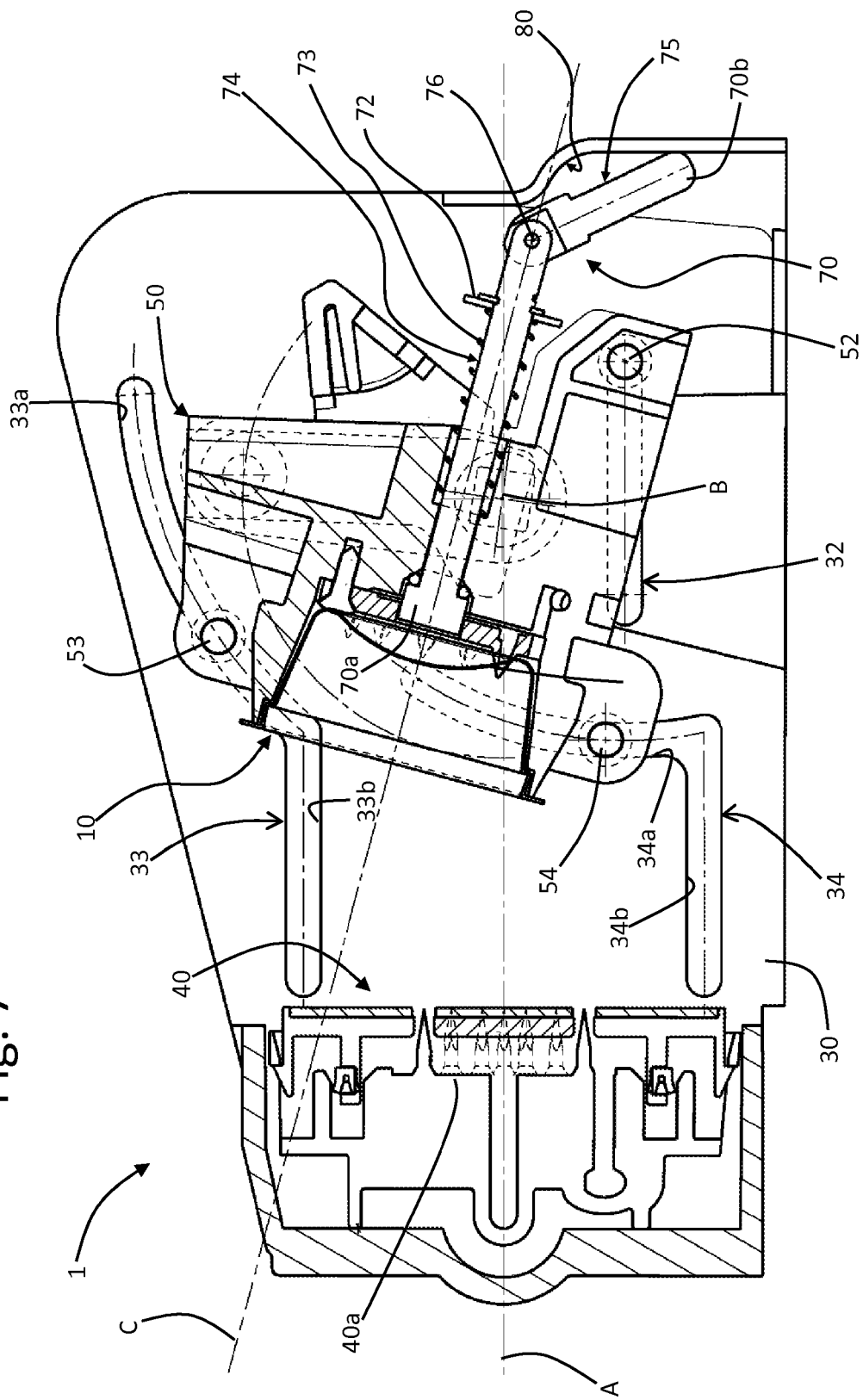

Starting from the loading position of FIGS. 3-4, via the handle 4 of FIG. 3, a rotation is imparted on the shaft 3 (in a counterclockwise direction, as viewed in the figure) about the corresponding axis B, with the capsule-holder 50 that starts to change its own position. In practice, the capsule-holder 50 starts to turn here in a counterclockwise direction about the axis identified by the pins 52, with the pins 53 and 54 that start to traverse the arched portions 33a and 34a, respectively, of the slits 33 and 34. FIG. 6 illustrates a first intermediate position of the pins 53 and 54 within the arched stretches 33a and 34a. This corresponds to a reduction of the angle formed between the axes A and C. FIG. 7 illustrates a further position assumed by the capsule-holder 50 during rotation of the shaft 3, with the pins 53 and 54 still engaged in the arched portions 33a and 34a of the slits 33 and 34 and with a further reduction of the angle between the axes A and C.

As may be appreciated also from FIGS. 4, 6 and 7, during angular motion of the capsule-holder 50 the rear part 75 of the ejector 70 is free to vary its own angular position with respect to the front part 74 and with respect to the reaction element 80. The end 70b of the ejector is in any case always resting on the front sliding surface of the reaction element 80, and in particular is still resting on its lower stretch (82, FIG. 5), countering the elastic reaction of the spring associated to the articulation 76.

Figure 8:
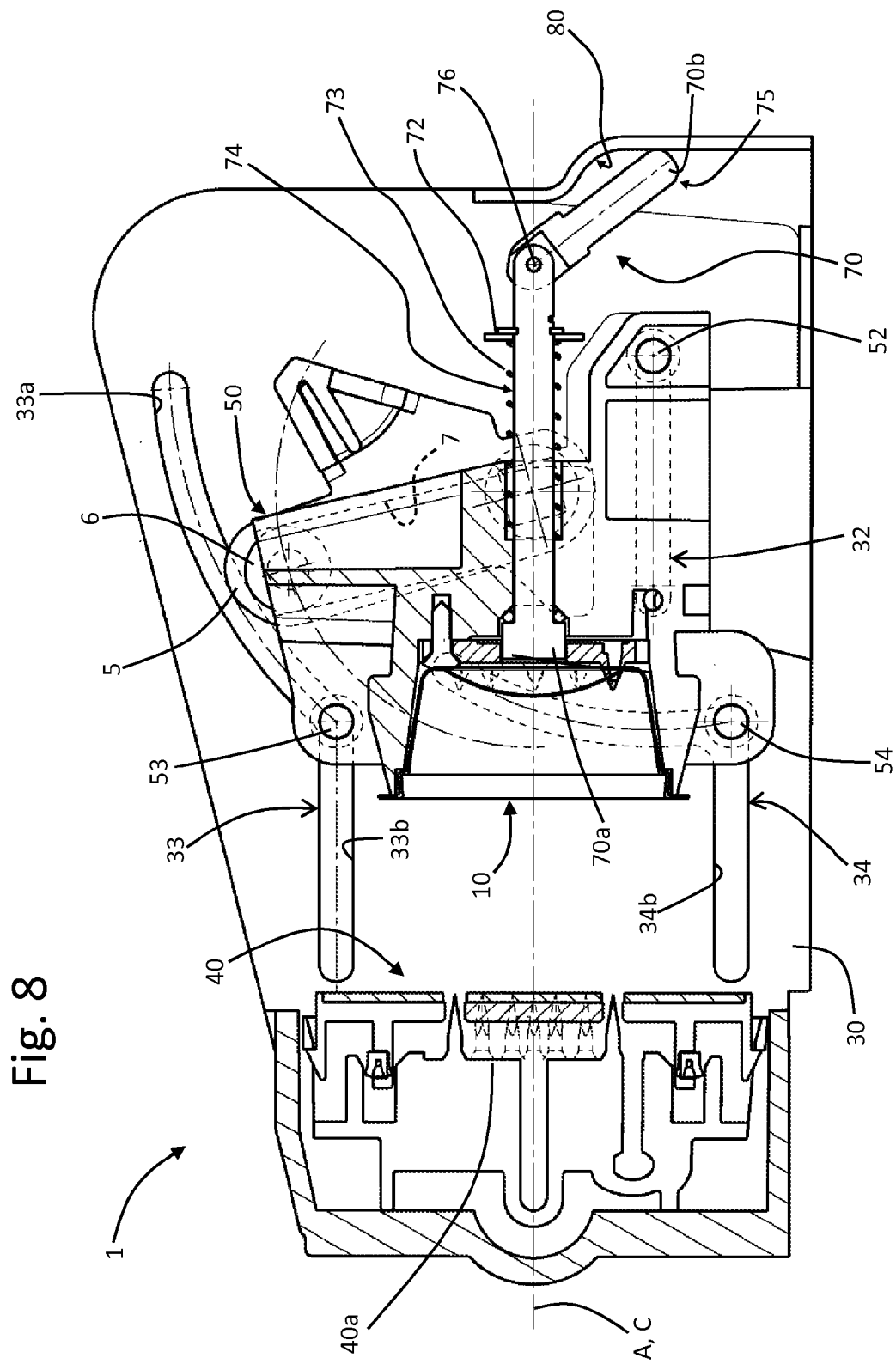

FIG. 8 illustrates the condition in which the pins 53 and 54 have reached the area of connection or transition between the arched portions 33a, 34a and the adjacent linear portions 33b, 34b, respectively, of the slits 33 and 34. In this condition, the axes A and C substantially coincide, and the capsule-holder 50 is still in an intermediate position at a distance from the injector 40. The rear end 70b of the ejector 70 is still resting on the front surface of the contrast element 80, at a greater height as compared to the conditions represented in FIGS. 6 and 7, once again forced in this condition by the spring associated to the articulation 76.

Figure 9:
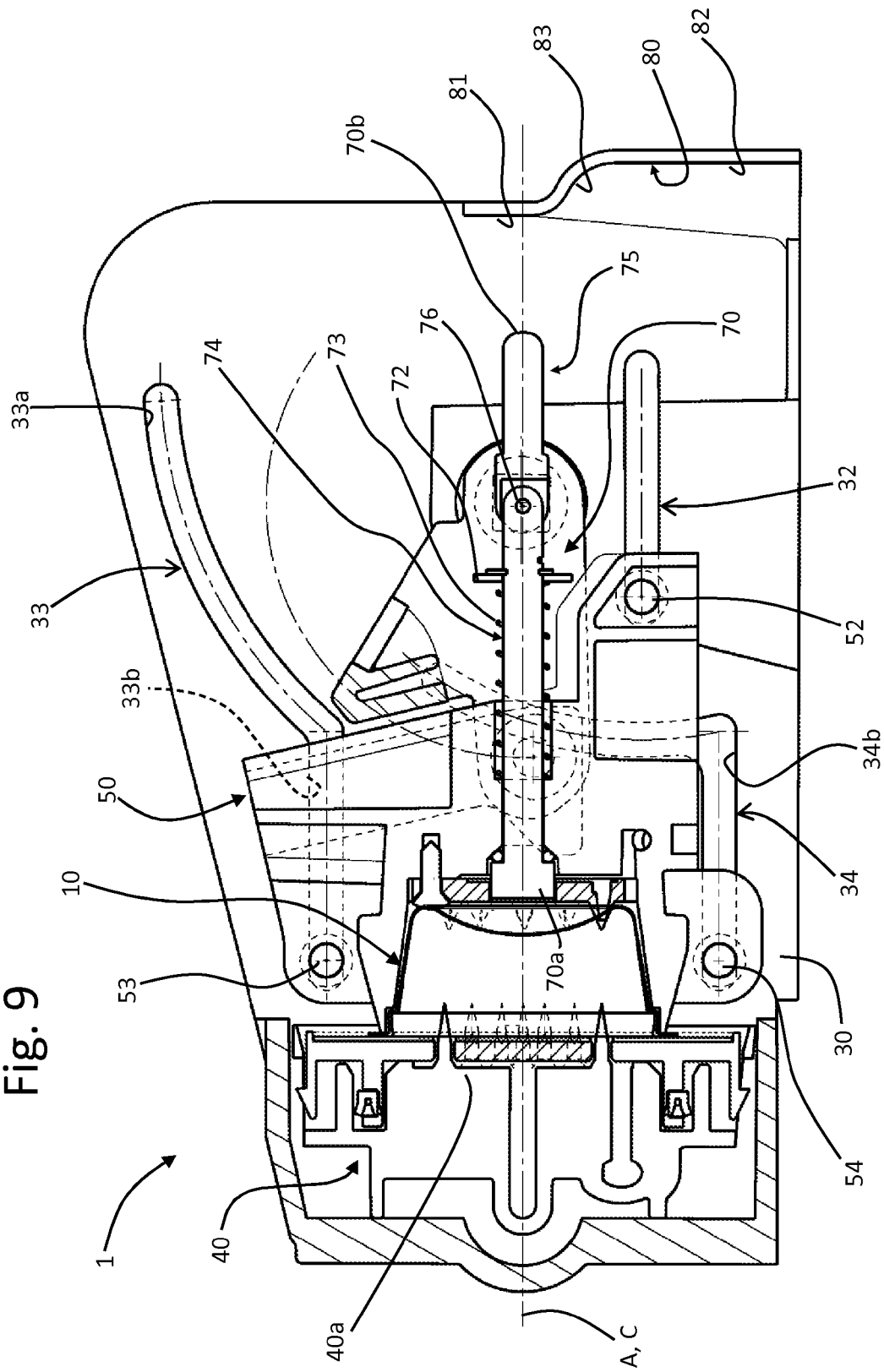

As the movement of the shaft 3 proceeds, the internal kinematic mechanism of the assembly 1 (via the arms 5, the rollers 6, and the corresponding guides 7 of FIG. 8) brings about linear translation or advance of the capsule-holder 50 in the direction of the injector 40, said translation now being guided by sliding of the pins 52 in the slits 32 and of the pins 53 and 54 in the linear portions 33b and 34b of the slits 33 and 34, respectively. Visible in FIG. 9 is the working position of the capsule-holder 50, i.e., its approached or coupled position to the injector 40. During translation of the capsule-holder 50 towards the position of FIG. 9, the ejector 70—the front part 74 of which is now set substantially horizontal and according to the axes A and C—is always held by the spring 73 in its withdrawn position, but progressively moves away from the reaction element 80. The rear end 70b of the ejector 70 rises up the front surface of the element 80, kept in contact thereto by virtue of the action that the spring of the articulation 76 exerts on the part 75, also traversing the connecting stretch 83. At a certain point, after the spring 73 has reached its condition of maximum expansion, the rear end 70b of the ejector 70 no longer interferes with the surface of the element 80, and the spring of the articulation 76 causes passage of the rear part 75 into the aforesaid predefined angular position with respect to the front part 74, as may be seen in FIG. 9.

In the example illustrated, the injector 40 and the capsule-holder 50 are both provided with corresponding perforating devices, designated by 40a and 50a, in FIG. 4 and FIG. 5, respectively, but this characteristic is not indispensable, the invention being usable in assemblies designed for use of pre-perforated capsules or cartridges made with filter paper. In any case, when the assembly 1 is in the condition illustrated in FIG. 9, a command is issued for injection into the capsule 10 of hot water and/or steam under pressure, and outflow of the liquid product from the capsule itself and from the capsule-holder 50 is obtained, all according to modalities in themselves known. The user can then bring the assembly 1 back into the initial condition of FIG. 4, i.e., bring the handle 4 of FIG. 3 from the position indicated with a solid line to the position indicated with a dashed line, thus causing reverse rotation of the shaft 3.

The capsule-holder 50 then recedes with respect to the position of FIG. 9, guided in this by the pins 52, 53 and 54, engaged in the slits 32 and in the linear portions 33b and 34b of the slits 33 and 34, respectively, and with the spring associated to the articulation 76 that keeps the rear part 75 of the ejector 70 in its predefined angular position with respect to the front part 74, the aforesaid pins being here substantially aligned in a horizontal direction. At a certain point of this translation in recession, the rear end 70b of the ejector 70 sticks against the front surface of the reaction element, and specifically in its upper stretch 81. The ejector 70 thus stops, while the capsule-holder 50 continues to recede, thereby also causing progressive compression of the spring 73. The head end 70a of the ejector moves progressively towards its advanced position with respect to the bottom of the housing 51 of the capsule-holder, thereby interfering with the bottom of the capsule 10, until it causes ejection thereof from the housing itself and consequent dropping thereof by gravity towards a bottom discharge passage of the assembly 1 (not indicated).

FIG. 10 illustrates the condition of maximum advance of the head end 70a of the ejector 70 with respect to the bottom of the housing 51, as well as of maximum compression of the spring 73, which is obtained when the pins 52, 53 and 54 have reached the rear end of the slits 32 and the areas of transition between the portions 33b, 34b and 33a, 34a of the slits 33 and 34, respectively.

The further reverse rotation of the shaft 3 then results in the pins 53 and 54 starting to traverse the arched portions 33a and 34a of the slits 33 and 34, thereby causing relative angular motion of the capsule-holder 50 and of the associated ejector 70. With the start of this reverse angular motion of the capsule-holder 50, then, the rear end 70b of the ejector 70 starts to turn and slide down the surface of the reaction element 80, and specifically over its stretch 81, and then reaches the connecting stretch 83. In said step, the ejector 70 is forced to recede as a whole by the elastic reaction of the spring 73, while the rear end 70b is kept in contact with the surface of the element 80 by the action of the spring associated to the articulation 76. Once the connecting stretch 83 is reached and as the reverse angular motion of the capsule-holder 50 proceeds, the rear part 75 of the ejector 70 is brought to move angularly, with respect to the front part 74, about the axis identified by the pin of the articulation 76a of FIG. 5, also in this case with a reverse motion (here clockwise) with respect to what occurred previously during passage of the capsule-holder from the loading position to the working position. In practice, then, the ejector 70 once again assumes a "bent" configuration, i.e., a configuration in which its parts 74 and 75 form between them a bottom angle that is less than 180°. The reverse angular motion of the part 75 comes about of course countering the elastic reaction of the spring proper to the articulation 76. Consequently, in practice, the capsule-holder 50 and the ejector 70 then behave in a way similar to the sequence shown in FIGS. 7, 6 and 4 (obviously, the capsule will no longer be present in the capsule-holder). At the end of the reverse angular motion of the shaft 3, the condition represented in FIG. 4 is hence again reached, where the capsule-holder 50 is once again in its loading position, ready to receive a new capsule 10.

From the foregoing description it will be appreciated that, in the assembly 1 illustrated previously, there is no longer the need to provide an oscillating reaction member. Thanks to this characteristic, the overall dimensions of the assembly 1, in particular its longitudinal dimension, can be reduced. In the practical embodiment, as in the embodiment exemplified, the functions of the reaction member of the known art can be provided by a stationary component of very contained dimensions, which can be associated to the support structure of the assembly. Very advantageously, such a reaction element can also be obtained directly from a corresponding portion of the stationary structure of the assembly, for example an end wall thereof. The ejector of the assembly according to the invention assumes in itself limited overall dimensions when the capsule-holder is in its distanced position from the injector, by virtue of its intermediate articulation and thanks to the consequent possibility of "bending".

The invention has been described previously with reference to an assembly provided with guide means 52-54 and 32-34 designed to enable roto-translational displacements of the capsule-holder, between a generally raised loading position and a generally lowered working position, where the above guide means can hence enable the capsule-holder both to oscillate about a substantially horizontal axis and to translate in a direction perpendicular to the aforesaid axis. The invention may in any case also be used in delivery assemblies in which the capsule-holder is only constrained to perform linear motion. Such an example of embodiment is illustrated schematically in FIGS. 11 and 12, where the same reference numbers as those employed in the previous figures are used to designate elements that are technically equivalent to the ones already described.

Figure 11:
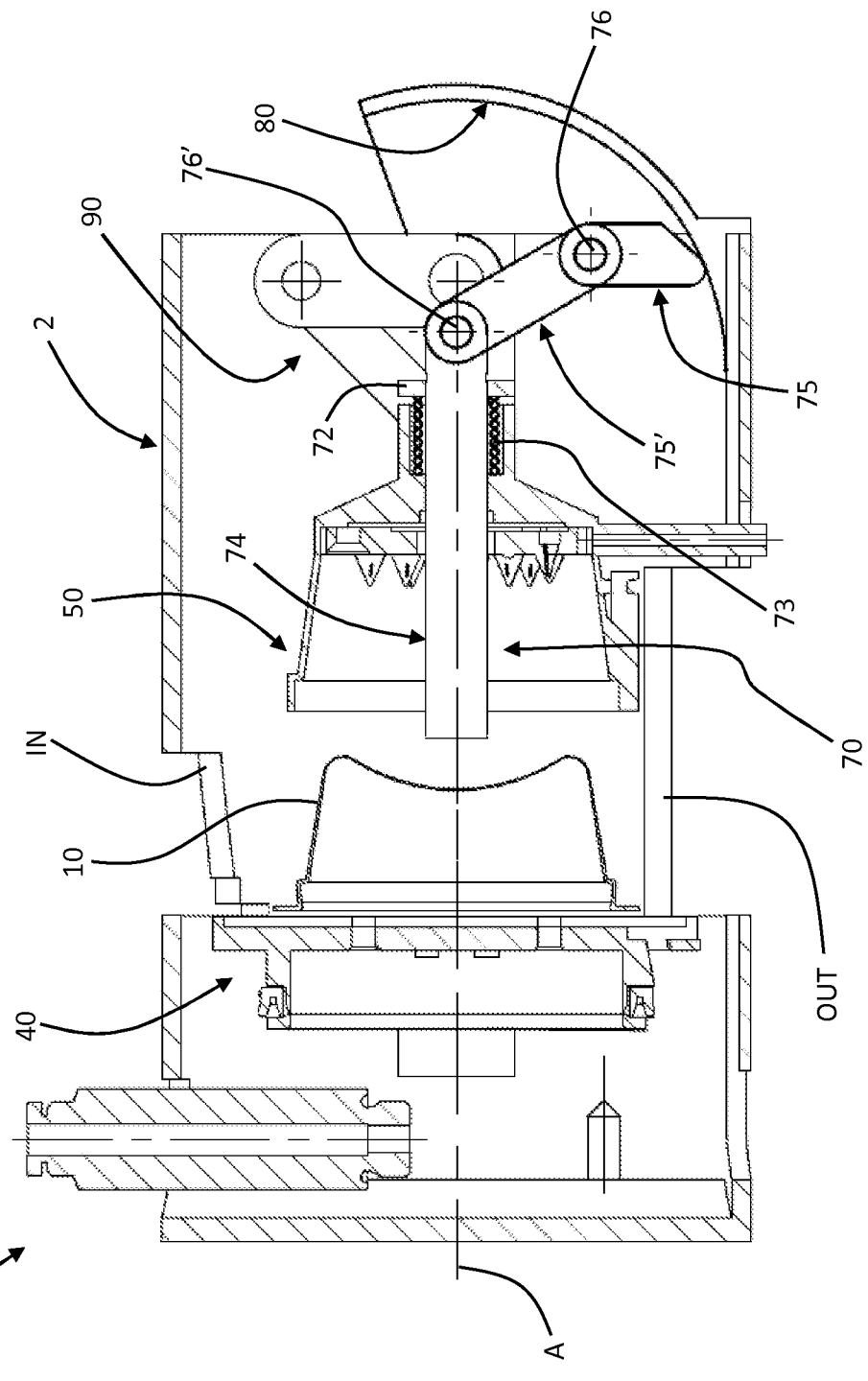
FIGS. 11-12 are partial schematic sections of a second embodiment of a delivery assembly according to the invention, in two different operating conditions.
Figure 12:
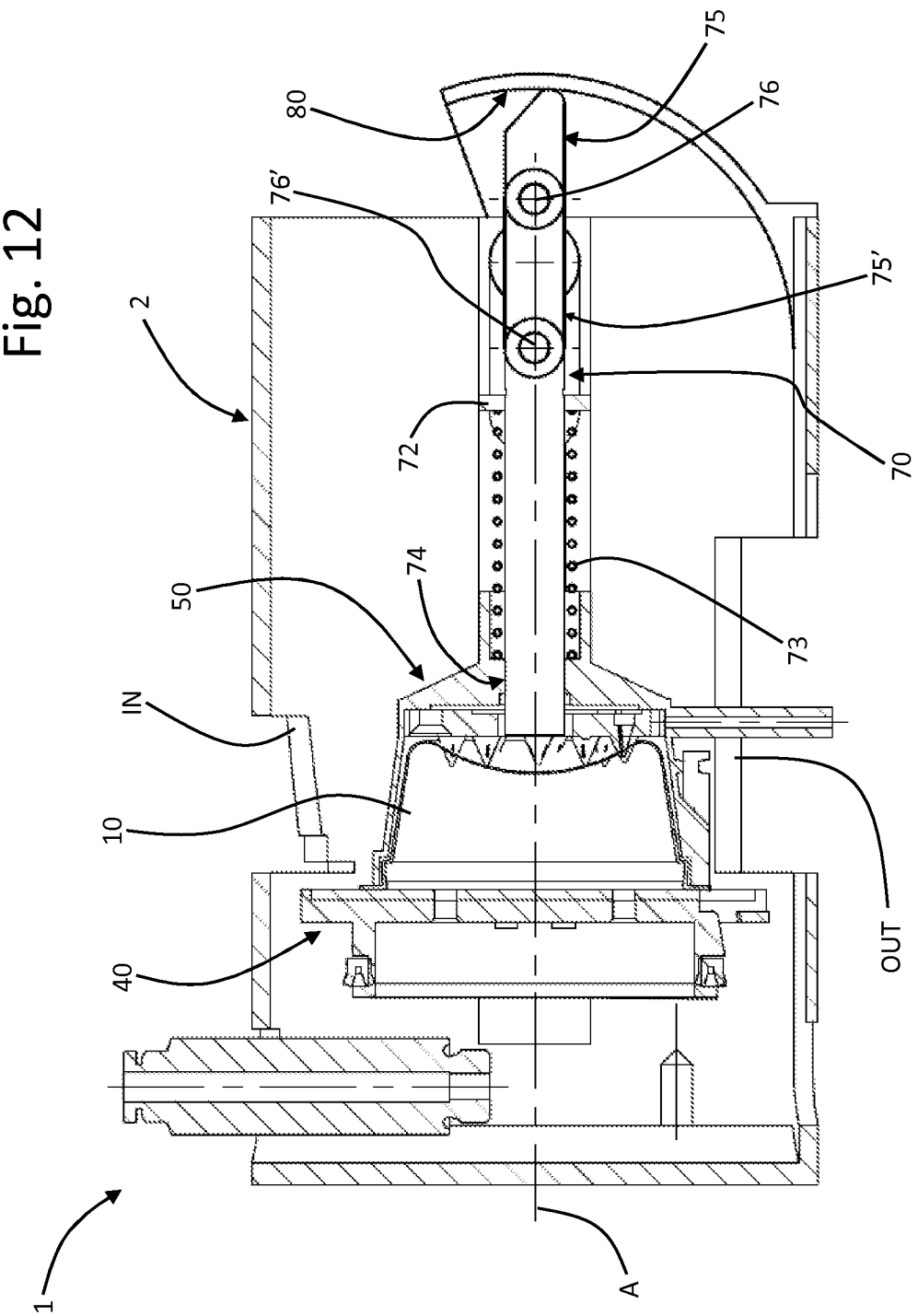

FIGS. 11-12 moreover bring out how, in a possible embodiment, an ejector 70 may comprise two intermediate articulations 76 and 76', for example of the type described previously. In this way, the ejector itself includes the front part 74, the rear part 75, and an intermediate part 75' for connecting in an articulated way the former two parts, together with the two aforesaid articulations 76 and 76'. Also in this embodiment, associated to at least one articulation, and preferably to both of them, is a corresponding spring or other elastic element, and in particular a spring for forcing the intermediate part 75' towards a predefined relative angular position with respect to the front part 74, and a spring for forcing the rear part 75 towards a predefined relative angular position with respect to the intermediate part 75'.

With reference to FIGS. 11-12, the assembly 1 has a structure or casing 2 with a generally horizontal axis, provided with an upper opening IN for introduction of the capsules from which to obtain the liquid product 10 and a lower opening OUT for unloading the exhausted capsules. The assembly 1 is here described limitedly to the elements useful for an understanding of the embodiments considered, taking for granted that it includes all the other elements normally known for its operation. In this perspective, for example, the assembly 1 can include a retention arrangement, for keeping a capsule 10 inserted by the upper opening IN—temporarily in a position substantially coaxial and intermediate with respect to the injector 40 and the capsule-holder 50, as represented schematically in FIG. 11. Such a retention arrangement—not illustrated—may include, for example, two divaricating jaw elements, subject to the reaction of a spring (see, merely by way of reference, WO 2006005736). In the example, the injector 40 is preferably substantially stationary (apart from a front cap thereof, which can recede slightly) and the capsule-holder 50 is movable only linearly, with a corresponding axial passage in which the ejector 70 slides, countered by the spring 73 that co-operates with the arrest 72. The linear movement of the capsule-holder 50 in advance and recession with respect to the injector 40, along the axis A, is obtained by means of a kinematic arrangement 90, of any type known in the field, for example a toggle mechanism or a crank mechanism. In this case, the assembly also includes guides that constrain the capsule-holder 50 to the linear motion between the position distanced from the injector 40 and the position approached to the injector 40, which include, for example, side guides of the casing 2 (not represented), in which respective lateral parts of the body of the capsule-holder 50 are engaged.

Also in this solution there is envisaged the reaction element 80, which defines the sliding surface for the rear end of the ejector, which also in this case preferentially has a profile that is at least partially rounded. Preferably, the aforesaid sliding surface is generally arched, even more preferably, is shaped like the arc of a circle, as illustrated.

FIG. 11 illustrates the condition of maximum recession of the capsule-holder 50, where the intermediate part 75' of the ejector 70 is in a respective first angular position with respect to the front part 74 (countering the reaction of the spring of the corresponding articulation 76') and the rear part 74 is in a respective first angular position with respect to the intermediate part 75' (countering the reaction of the spring of the corresponding articulation 76). In this condition, a capsule 10 can be inserted into the assembly 1 through the upper inlet IN and temporarily withheld in the position illustrated, as mentioned above.

When the mechanism 80 is operated, for example manually, the capsule-holder 50 starts to displace towards the injector 40, thereby causing progressive slackening of the spring 73 and—thanks to the presence of the springs of the articulations 76, 76'—progressive angular motion (here in a counterclockwise direction) of the intermediate part 75' and rear part 75 towards the respective pre-set positions, as described previously with reference to the part 75 of the first embodiment. Also in this case, then, the rear end of the ejector 70, corresponding to the part 75, slides on the surface of the reaction element 80, which substantially provides a cam surface.

During advance, the capsule-holder 50 picks up the capsule 10 and pushes it towards the injector 40. FIG. 12 illustrates the condition of maximum advance of the capsule-holder 50, where, as may be noted, the ejector 70 has assumed a generally rectilinear configuration, i.e., with its parts 74, 75' and 75 substantially coaxial.

The front end of the ejector 70 is now more advanced (towards the injector 40) with respect to the position of FIG. 11: however, thanks to the movement of advance of the capsule-holder 50, said front end is located in any case in a position such as not to interfere with the bottom of the capsule 10 housed in the capsule-holder.

After infusion and delivery of the liquid product, which occurs according to known modalities, the kinematic arrangement 80 is operated in the reverse direction opposite to the previous one so as to bring about recession of the capsule-holder 50 towards its original position. With this movement, the body of the capsule-holder 50 pushes the ejector 70 back up to its stop 72. The cam surface defined by the reaction element 80, as well as the shape and size of the rear end of the part 75 are parameterized in such a way that the force generated by the recession determines a torque or momentum such as to cause angular motion (here clockwise) of the part 75 with respect to the intermediate part 75', with the rear end of the part 75 that then starts to slide on the aforesaid cam surface. As recession of the capsule-holder 50 and of the ejector 70 proceeds, the angular motion of the rear part 75 also proceeds and, at a certain point, also the intermediate part 75' starts to move angularly (in a counterclockwise direction) with respect to the front part 74, until the position visible in FIG. 11 is reached. During recession, the front end of the ejector 70 assumes an advanced position with respect to the bottom of the chamber defined in the capsule-holder 50, and hence with respect to the bottom of the capsule 10. In this way, the front end of the ejector 70 pushes the capsule progressively towards the outside of the aforesaid chamber until it is completely ejected and consequently drops by gravity towards the outlet OUT, with return of the assembly 1 into its starting condition, ready to load a new capsule 10.

In another possible variant embodiment (not represented), the assembly may be devised so that the loading position and the working position of the capsule-holder are both oriented in a generally vertical direction, as in the case of EP 1854384 A1. In such an embodiment, the articulation (or each articulation) provided by the ejector could exploit the mass of the rear part of the ejector to force the latter to assume the predefined relative position with respect to its front part, without any need for a corresponding spring.

Of course, use of an ejector consisting of at least three parts is also possible in the case of assemblies with roto-translational movement, as in the first embodiment described.

Obviously, the assembly according to the invention does not necessarily have to be manually operated given that it may comprise, for example, a pneumatically operated or electrically operated actuation system, for example a motor with associated motor reducer.

The invention claimed is:

1. A delivery assembly for a machine for preparing liquid products using capsules, the delivery assembly comprising:
    a support structure bearing an injector device for introducing a fluid into a capsule;
    a capsule-holder, mounted movable in the support structure;
    guide means, designed to enable the capsule-holder to displace between an open position, in which the capsule-holder is farther from the injector device, to enable loading of a capsule into the assembly, and a closed position, in which the capsule-holder is closer to the injector device, to enable injection of the fluid into the capsule loaded in the capsule-holder;
    an actuation mechanism, operable for causing displacements of the capsule-holder between the open position and the closed position;
    a longitudinally extended ejector member, mounted movable on the capsule-holder and designed to eject the capsule outside of the capsule-holder during displacement of the capsule-holder from the closed position to the open position, the ejector member having a head end capable to assume a withdrawn position and an advanced position relative to a bottom of the capsule-holder, and a rear end that is able to mechanically co-operate with a constraining element defined by, or associated to, the support structure,
    wherein the ejector member comprises a plurality of parts connected in an articulated way, amongst which at least one first part, including said head end, and one second part, including said rear end, the first part and the second part being articulated in such a way that the second part is able to assume a plurality of angular positions with respect to the first part and to the constraining element during displacement of the capsule-holder between the open position and the closed position.

2. The delivery assembly according to claim 1, wherein the constraining element is a stationary constraining element with respect to the capsule-holder and the ejector member.

3. The delivery assembly according to claim 1, wherein the plurality of angular positions comprises at least an operative position and an inoperative position that are assumed by the second part of the ejector member in a first step and a second step, respectively, of the displacement of the capsule-holder from the closed position to the open position, in the operative position the rear end being able to co-operate with the constraining element so as to prevent a relative displacement between the ejector member and the capsule-holder and in the inoperative position the rear end being able to co-operate with the constraining element so as to enable a relative displacement between the ejector member and the capsule-holder.

4. The delivery assembly according to claim 3, wherein the ejector member has at least one articulation that is intermediate to the first part and the second part and comprises arrest means for defining said operative position of the second part with respect to the first part.

5. The delivery assembly according to claim 4, wherein the ejector member has means for urging the second part to assume said operative position with respect to the first part.

6. The delivery assembly according to claim 2, wherein the constraining element has a surface generally facing a back of the capsule-holder, on which the rear end of the ejector member is able to slide.

7. The delivery assembly according to claim 6, wherein said surface includes at least two stretches that extend at different distances with respect to the injector device.

8. The delivery assembly according to claim 1, wherein the rear end of the ejector member has an at least partly rounded profile.

9. The delivery assembly according to claim 1, wherein at least the first part of the ejector member is slidable in a through opening of the capsule-holder, between the capsule-holder and the ejector member there being operative elastic means that urge the ejector member to assume said withdrawn position.

10. The delivery assembly according to claim 1, wherein the guide means and the actuation mechanism are configured in such a way that:
   starting from said open position, an actuation of said actuation mechanism is able to cause an oscillation of the capsule-holder and a subsequent translation of the capsule-holder as far as said closed position; or else
   starting from said open position, an actuation of said actuation mechanism is able to cause a linear displacement of the capsule-holder as far as to said closed position.

11. The delivery assembly according to claim 1, wherein the ejector member comprises at least one first part, including said head end, a second part, including said rear end, and an intermediate part that connects the first part to the second part in an articulated way, the intermediate part being able to assume a plurality of angular positions with respect to the first part, to the second part, and to the constraining element during displacement of the capsule-holder between the open position and the closed position.

12. A machine for preparing liquid products via capsules, comprising a delivery assembly according to claim 1.

13. A system for preparing liquid products, comprising:
   a machine that includes a delivery assembly according to claim 1; and
   a capsule containing a dose of at least one substance capable of forming a liquid product via a fluid;
   wherein
   during displacement of the capsule-holder from the open position to the closed position, the first and second parts of the ejector member assume at least one first relative angular position such that the head end of the ejector member is able to assume a withdrawn position relative to the bottom of the capsule-holder; and
   during displacement of the capsule-holder from the closed position to the open position, the first and second parts of the ejector member assume at least one second relative angular position, such that the head end of the ejector member is able to assume an advanced position relative to the bottom of the capsule-holder.

14. A method for preparing a liquid product, comprising the steps of:
   providing a machine for preparing liquid products comprising a delivery assembly according to claim 1;
   providing a capsule containing a dose of at least one substance capable of forming the liquid product via a fluid;
   loading the capsule into the delivery assembly when the capsule-holder is in said open position;
   operating the actuation mechanism for displacing the capsule-holder to said closed position;
   with the capsule-holder in said closed position, injecting by means of the injector device a fluid into the capsule to prepare the liquid product, and discharging the liquid product from the capsule-holder;
   bringing the capsule-holder back in said open position, during passage of the capsule-holder from said closed position to said open position the ejector member causing ejection of the capsule from the capsule-holder, and wherein
   during displacement of the capsule-holder from the open position to the closed position, the first part and the second part of the ejector member assume at least one first relative angular position such that the head end of the ejector member is able to assume a withdrawn position with respect to the bottom of the capsule-holder; and
   during displacement of the capsule-holder from the closed position to the open position, the first part and the second part of the ejector member assume at least one second relative angular position such that the head end of the ejector member is able to assume an advanced position with respect to the bottom of the capsule-holder.

15. The delivery assembly according to claim 5, wherein said means for urging comprise an elastic element operatively associated to the articulation.

16. The delivery assembly according to claim 6, wherein said surface includes at least one generally curved or inclined or arched stretch.

17. The delivery assembly according to claim 7, wherein said at least two stretches comprise a first stretch closer to the injector device, a second stretch more distant from the injector device and a connecting stretch between the first stretch and the second stretch.

* * * * *